United States Patent [19]
Föhl

[11] Patent Number: 5,362,099
[45] Date of Patent: Nov. 8, 1994

[54] DEVICE FOR THE SUDDEN RELEASE OF A GAS FROM A CONTAINER ADAPTED TO STORE IT FOR A LONG PERIOD OF TIME UNDER A HIGH PRESSURE

[75] Inventor: Artur Föhl, Schorndorf, Germany

[73] Assignee: TRW Repa GmbH, Alfdorf, Germany

[21] Appl. No.: 955,903

[22] PCT Filed: Apr. 15, 1992

[86] PCT No.: PCT/EP92/00849
§ 371 Date: Dec. 14, 1992
§ 102(e) Date: Dec. 14, 1992

[87] PCT Pub. No.: WO92/18356
PCT Pub. Date: Oct. 29, 1992

[30] Foreign Application Priority Data
Apr. 15, 1991 [DE] Germany ............ 9104577[U]

[51] Int. Cl.5 .................................... B60R 21/26
[52] U.S. Cl. ............................ 280/737; 222/5; 137/68.2
[58] Field of Search ......... 280/737, 736, 734, 741 R, 280/742, 728 R; 222/5; 137/68.2

[56] References Cited

U.S. PATENT DOCUMENTS

| | | | |
|---|---|---|---|
| 3,567,245 | 3/1971 | Ekstrom | 280/737 |
| 3,596,799 | 8/1971 | Fairchild et al. | 222/5 |
| 3,613,944 | 10/1971 | Zeigler et al. | 222/5 |
| 3,670,925 | 6/1972 | Moyant | 222/3 |
| 3,727,575 | 4/1973 | Prachar | 280/734 |
| 3,749,282 | 7/1973 | Day et al. | 280/734 |
| 3,780,752 | 12/1973 | Noddin et al. | 137/68 |
| 3,915,235 | 10/1975 | Hamilton et al. | 137/68.2 |

FOREIGN PATENT DOCUMENTS

| | | |
|---|---|---|
| 2072944 | 9/1971 | France. |
| 2096188 | 2/1972 | France. |
| 2052621 | 5/1971 | Germany. |
| 1329505 | 9/1973 | United Kingdom. |
| 2220620 | 1/1990 | United Kingdom. |

OTHER PUBLICATIONS

International Search-Report PCT/EP 92/00849.

*Primary Examiner*—Brian L. Johnson
*Assistant Examiner*—Paul Dickson
*Attorney, Agent, or Firm*—Tarolli, Sundheim & Covell

[57] ABSTRACT

For the sudden release of a gas from a container (10, 12; 60) adapted to store it for a long period of time under a high pressure for the inflation of a gas bag in vehicle occupant restraining system, an obstructing member (26), manufactured of pre-stressed glass, is arranged upstream from the outlet opening (66) of the container (60). On its end surface facing into the interior of the container the obstructing member (26) bears a sealing film (64). On its opposite end surface the obstructing member bears an rectangularly projecting, pin-shaped extension (26a). By fracturing this extension (26a) by a vehicle-sensitive mass (70) the structure of the obstructing member (26) is shattered with the result that the member spontaneously breaks up into small or powder-like particles and frees the outlet opening (66).

14 Claims, 2 Drawing Sheets

DEVICE FOR THE SUDDEN RELEASE OF A GAS FROM A CONTAINER ADAPTED TO STORE IT FOR A LONG PERIOD OF TIME UNDER A HIGH PRESSURE

BACKGROUND OF THE INVENTION

The invention relates to a device for the sudden release of a gas from a container adapted to store it for a long period of time under a high pressure for the inflation of a gas bag in a vehicle occupant restraining system, comprising an obstructing member manufactured of tempered glass, which is arranged upstream from the at least one outlet opening of the container and in cooperation with a seal shuts off such outlet opening, and furthermore a vehicle-sensitive actuating device, by which the structure of the obstructing member can be damaged to such an extent that the member spontaneously shatters into fine particles.

A device of this type is disclosed in the German patent publication 2,052,621 A. In the case of this device the obstructing member is cylindrical in design and is mounted in a stepped hole in an obstructing plug, which is screwed into a screw threaded opening in a container. This obstructing member has its end surface, which is turned towards the inside of the container, bearing against sealing film, which furthermore shuts off an annular space formed inside the obstructing member and which accommodates an electrically fired pyrotechnic charge. On firing such pyrotechnic charge the closing member shatters into fine particles and the outlet channel coaxially formed in the obstructing plug is freed. For a reliable shattering of the obstructing member a pyrotechnic charge with a considerable size is necessary.

SUMMARY OF THE INVENTION

The invention provides a device for the sudden release of a gas from a container in which it is arranged to be stored for a long period of time and which also comprises an obstructing member of tempered glass on the inside of one or more outlet openings of the container and which is distinguished by the fact that the shattering of the obstructing member only needs a small quantity of energy.

In accordance with the invention the obstructing member is provided with an extension projecting, preferably in a perpendicular direction, from its surface and which is subject to the action of an actuating element of the actuating device, by which it is able to be suddenly fractured. The invention is based on the notion that for the spontaneous shattering of the obstructing member, if it consists of pre-stressed i.e. tempered glass, a shear force may be introduced into the solid part of the obstructing member by way of the extension which acts as a lever at whose free end a small force is sufficient in order to produce a high shear load on the base of the extension. Owing to the sudden fracture of the extension under the load there is admittedly only a local damage to the surface of the obstructing member, but it has been seen that this damage is just as effective as regards the spontaneous shattering of the obstructing member as the prior art pyrotechnic charge of a considerable size. The force necessary for fracturing the extension may readily be produced by a mass sensitive to the vehicle which can be arranged directly adjacent to the obstructing member with the result that there is a compact subassembly, which comprises the vehicle-sensitive actuating sensor.

In order for the quantity of gas necessary for the inflation of a gas bag to be accommodated in a compact container, it is necessary for it to be stored under an extremely high pressure of some hundred atmospheres. Therefore there are exacting requirements as regards long term resistance to high pressures. Since the gas pressure in the interior of the gas container is dependent, in accordance with well known physical laws, on the gas temperature, it is necessary for the designer to take the temperature range significant for normal use of the vehicle into account as regards the size of the container. However it is hardly possible to design the container for extremely high temperatures, as for instance in the case of a fire in the vehicle. In order to prevent an explosion of the container when it is overheated, there is the further possible feature of the invention that the outlet opening of the container may be discharged in a controlled manner prior to serious overheating by causing fracture of the extension thereof. For this purpose there is a thermal actuating element, which is independent of the vehicle-sensitive actuating device, more particularly in the form of a bimetallic element in thermal contact with the container, the temperature-dependent deformation of the element causing a shear force to act on the extension so that the same is ultimately fractured.

BRIEF DESCRIPTION OF THE DRAWINGS

Further advantageous developments and convenient forms of the invention will be understood from the following detailed descriptive disclosure in conjunction with the accompanying drawings.

DESCRIPTION OF THE PREFERRED EMBODIMENTS

Figure 1:
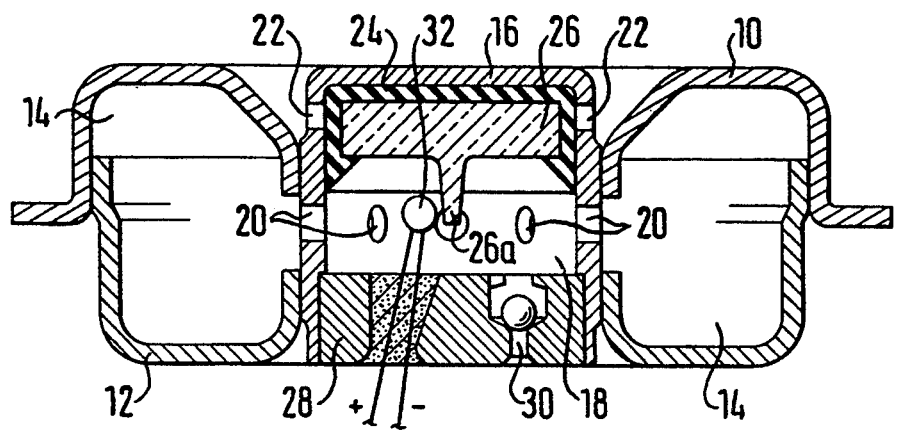
FIG. 1 is a cross section taken through a pressurized gas container, whose outlet openings are shut off by an obstructing member of pre-stressed, i.e. tempered glass.

The compressed gas container shown in FIG. 1 is formed by housing parts 10, 12, forming an annular compressed gas chamber 14, and a central housing part 16 which delimits a cylindrical chamber 18. Said chamber 18 is connected by a plurality of openings 20 with the compressed gas chamber 14. In the housing part 16 there are discharge openings 22 which are kept sealed by a sealing element 24 and an obstructing member 26 pressing said element against the inner wall surface of the chamber 18. The gas pressure in the interior of the chamber 14 may be several hundred atmospheres. The obstructing member 26 subjected to this pressure is pressed against the sealing element 24 and the latter is pressed against the inner wall surface of the chamber 18.

On the side opposite the obstructing member 26 the chamber 18 is closed by a cover 28 in which a filling passage 30 provided with a check valve is formed.

The obstructing member 26 consists of a material which has the property of shattering spontaneously into a great number of particles following local mechanical damage to its structure. It preferably consists of tempered glass. It is provided with a stud-like or pin-like extension 26a which projects perpendicularly from its surface facing the chamber 18. The extension 26a is elongate and cylindrical, and has a length which is greater than its width. An electrically activated priming cap 32 is arranged directly adjacent this extension 26a. The electrical lead wires for this priming cap 32 extend through the cover 28 and are sealed in a pressure-resistant manner in said cover.

The local mechanical damage to the structure of the obstructing member 26 in this embodiment is by shattering of the extension 26a by means of the pyrotechnical priming cap 32 which is activated by a vehicle-sensitively generated electrical pulse. Due to this local mechanical damage to the mechanical structure of the obstructing member 26 the latter spontaneously shatters to form extremely small or dust-like glass particles having a size which can be controlled by the production and composition parameters of the obstructing member. The sealing element 24 is then ruptured by the extremely high pressure in the interior of the chambers 14 and 18 and the discharge openings 22 are consequently freed. With the pressurized gases thus liberated an air bag can be inflated in a vehicle occupant restraining system. In another embodiment, by means of the pressurized gases thus suddenly liberated, a pneumatic drive of a belt pre-tensioner in a safety belt restraining system is activated.

Figure 2:
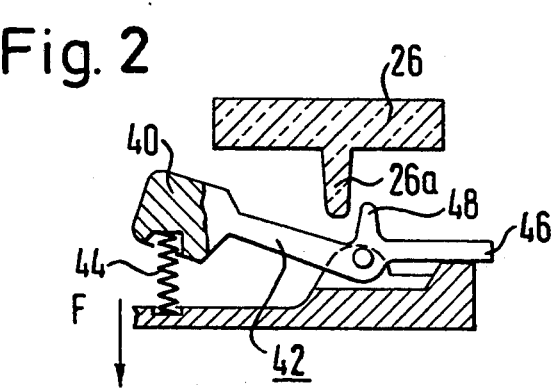
FIG. 2 shows the vehicle-sensitive actuating device with one inertial mass.

In the embodiment shown in FIG. 2 the local mechanical damage to the structure of the obstructing member 26 is caused purely mechanically. A vehicle-sensitive mass 40 is arranged at the end of a pivotally mounted lever 42 held in a rest position by a pressure spring 44. This rest position is defined by a lever arm 46 which comes to bear on an abutment surface. In the rest position shown in FIG. 2 a lever arm 48 is disposed a small distance from the extension 26a of the obstructing member 26. Under the action of an inertial force engaging the inertial mass 40 in the direction of the arrow F the lever 42 is pivoted counterclockwise against the action of the pressure spring 44 until the lever arm 48 strikes the extension 26a and breaks the latter off.

Figure 3:
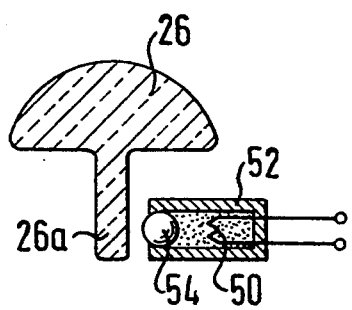
FIG. 3 shows a vehicle-sensitive actuating device with a pyrotechnic charge and an inertial mass adapted to act thereon.

In the case of the working embodiment depicted in FIG. 3 the vehicle-sensitive actuating device comprises an electrically fired pyrotechnic charge 50, which is arranged in a cylindrical tube 52, which is shut off at its free end by an inertial body in the form of a ball 54 and is arranged opposite to the free end of the extension 26a of the obstructing member 26. On firing the pyrotechnic charge 50 the ball 54 is slung like a projectile against the extension 26a and fractures it.

Figure 4:
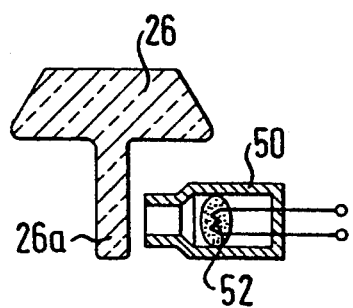
FIG. 4 shows a vehicle-sensitive actuating device with a pyrotechnic charge, which is adapted to produce an impact wave.

In the case of the working embodiment in accordance with FIG. 4 the vehicle-sensitive actuating device is also an electrically fired pyrotechnic charge 50 accommodated in a cylindrical tube 52. This cylindrical tube 52 is tapered to a nozzle at its free end opposite to the extension 26a. This device is suitable for the production of an impact wave, by which the extension 26a is broken off the obstructing member 26.

Figure 5:
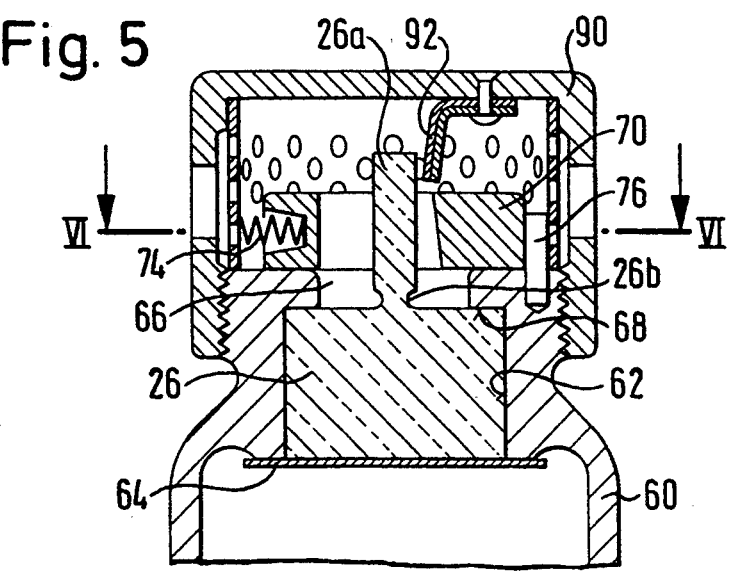
FIG. 5 is an axial section taken through part of a pressurized gas container adjacent to its outlet opening.
Figure 6:
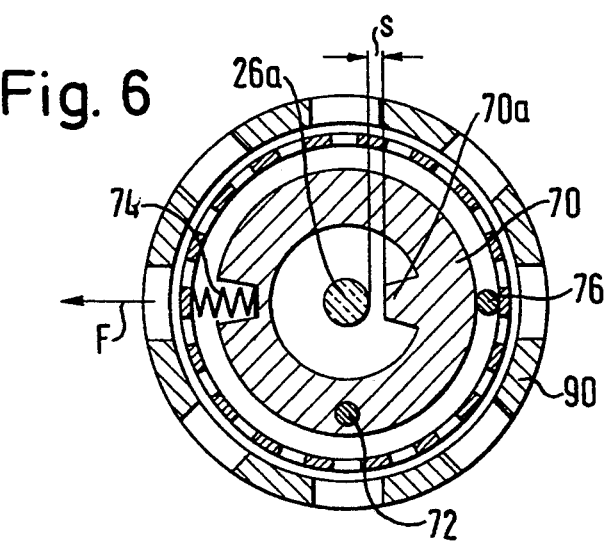
FIG. 6 is a section taken on the line VI—VI of FIG. 5.

FIGS. 5 and 6 show a working embodiment with a generally cylindrical gas pressure container 60. This container 60 is united in a manner to be described with a vehicle-sensitive actuating mechanism as a single subassembly.

At its axial end illustrated in FIG. 5 the gas pressure container 60 is provided with a cylindrical receiving space 62 for a solid, cylindrical obstructing member 26. The end surface, facing the interior of the container, of the obstructing member 26 bears a metallic film 64, which is secured in a sealing manner at its outer edge to the inner wall surface of the gas pressure container 60 and is more particularly welded to it. The sealing film 64 shuts off the receiving space 62 from the inner side of the container. An outlet opening 66 of the gas pressure container is arranged coaxially to the receiving space 62. Between this outlet opening 66 and the cylindrical receiving space 62 a radial annular shoulder 68 is formed, on which the obstructing member 26 bears. A pin-shaped extension 26a of the obstructing member 26 extends coaxially out of the outlet opening 66. Adjacent to its base, which adjoins the solid part of the obstructing member 26, the extension 26a is provided with an encircling annular groove 26b. This annular groove 26b ensures that fracture of the extension 26a may take place with a particularly small actuating force and under exactly reproducible conditions.

An annular vehicle-sensitive inertial body 70 is pivoted on a pin 72 at the end, which is illustrated in FIG. 5, of the gas pressure container. The inertial mass 70 is held by a compression spring 74 against a pin-shaped abutment 76 in such a rest position that an extension 70a, which is directed radially inwards, on the inertial body 70 is kept at a predetermined distance s from the extension 26a of the obstructing member 26. The gas pressure container 60 is so installed in the vehicle that the inertial mass 70 is able to be pivoted against the force of the compression spring 74 in the direction of travel; the direction of travel is indicated in FIG. 6 by an arrow F. If there is a sufficiently high deceleration of the vehicle the extension 26a of the obstructing member 26 is fractured by striking the extension 70a.

Figure 7:
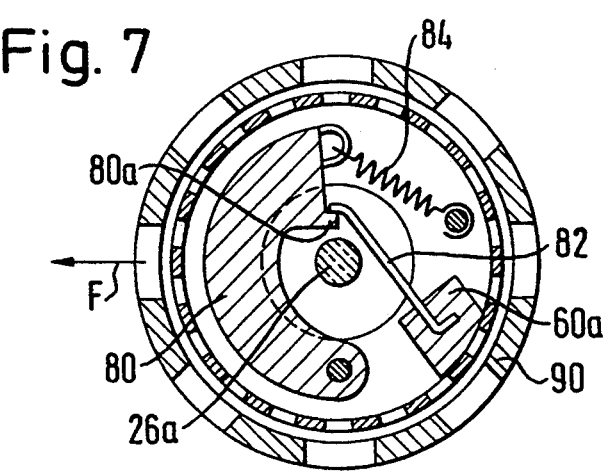
FIG. 7 is a sectional view similar to that of FIG. 6 but relating to a further working embodiment of the vehicle-sensitive actuating device.

In the case of the modification of the design illustrated in FIG. 7 the vehicle-sensitive inertial body 80 is designed as half a ring and functions as a support for a pre-tensioned impact spring 82, which is anchored in an axial extension 60a on the gas pressure container 60. The free end of this impact spring 82, in the form of a strip spring, is held at a distance clear of the extension 26a of the vehicle-sensitive obstructing member. A tension spring 84 functions to hold the vehicle-sensitive inertial mass 80 in the rest position illustrated in FIG. 7. A pivotal movement responsive to the vehicle of the inertial mass 80 in the direction of the arrow F causes the impact spring 82 to be released with the result that it will strike against the extension 26a with a sufficient force to fracture it.

In both working embodiments the fracture of the extension 26a causes spontaneous shattering of the solid part of the obstructing member 26 so that the outlet opening 66 of the gas pressure container 60 is unplugged.

As shown in FIG. 5 furthermore the gas pressure container 60 bears a screw-on cap 90 on its axial end. On the inner side of this cap 90 a generally rectangularly bent bimetallic element 92 is arranged to be in thermal contact with the cap 90 and accordingly is also secured to the gas pressure container 60. The free end of the bimetallic element 92 is at a predetermined distance clear of the end of the extension 26a of the obstructing member 26 as long as the intended operating temperature is maintained, for which the gas pressure container 60 is designed. When this value is exceeded there will be a deformation of the bimetallic element 92 with the result that the free end thereof will bear against the free end of the extension 26a and acts on the same with a force, which increases rapidly with an increase in temperature. Even prior to a temperature being reached at which bursting of the gas pressure container 60 is likely, the extension 26a is fractured or broken off by the bimetallic element 92 so that the obstructing member 26 is shattered and the gas pressure container 60 is discharged.

The thermal protection means as shown in FIG. 5 for the gas pressure container 60 is independent of the vehicle-sensitive actuating mechanism and may be utilized in a similar form in the working embodiment in accordance with FIG. 1 as well. In the case of the working embodiment of the actuating device illustrated in FIGS. 2 through 4 as well there is preferably a thermal protection means of the type illustrated in FIG. 5 additionally to the vehicle-sensitive actuating device.

I claim:

1. A device for sudden release of pressurized gas from a container to inflate a gas bag in a vehicle occupant restraining system, said container having at least one outlet opening and comprising an obstructing member of tempered glass arranged upstream from said outlet opening and a seal cooperating with said obstructing member to block said outlet opening, and said obstructing member having a solid body and a base, an elongated cylindrically pin-shaped extension having a length greater than its width and projecting from said base, and said pin-shaped extension being adapted to be broken by a vehicle-sensitive actuating member to shatter the body of said obstructing member.

2. The device of claim 1, wherein said actuating member comprises an inertial mass adapted to be projected by an electrically fired pyrotechnic charge.

3. The device of claim 1, wherein said actuating member comprises an electrically fired pyrotechnic charge which on being fired produces a shock wave.

4. The device of claim 1, wherein said actuating member comprises a vehicle-sensitive inertial body.

5. The device of claim 1, wherein said actuating member is formed by a spring-loaded striking element held by a vehicle-sensitive inertial mass in a rest position at a distance clear of said pin-shaped extension of the obstructing member.

6. The device of claim 1, wherein said vehicle-sensitive actuating member is accommodated in said container and arranged adjacent to said extension of the obstructing member.

7. The device of claim 1, wherein said extension of the obstructing member projects perpendicularly from said base and said actuating member being engageable with a free end of said extension.

8. A device for sudden release of pressurized gas from a container to inflate a gas bag in a vehicle occupant restraining system, said container having at least one outlet opening and comprising an obstructing member of tempered glass arranged upstream from said outlet opening and a seal cooperating with said obstructing member to block said outlet opening, and said obstructing member having a solid body and a base, an extension projecting from said base, said extension being adapted to be broken by a vehicle-sensitive actuating member, and said extension being adapted to be broken by a bimetallic element which is in thermal contact with said container, and said body being shattered when said extension is broken.

9. A device for sudden release of pressurized gas from a container to inflate a gas bag in a vehicle occupant restraining system, said container having at least one outlet opening and comprising an obstructing member of tempered glass arranged upstream from said outlet opening and a seal cooperating with said obstructing member to block said outlet opening, and said obstructing member having a solid body and a base, a pin-shaped extension projecting from said base, said pin-shaped extension being provided with a notch or groove adjacent said base, and said pin-shaped extension being adapted to be broken by a vehicle-sensitive actuating member to shatter the body of said obstructing member.

10. A device for sudden release of pressurized gas from a container to inflate a gas bag in a vehicle occupant restraining system, said container having at least one outlet opening and comprising an obstructing member of tempered glass arranged upstream from said outlet opening and a seal cooperating with said obstructing member to block said outlet opening, and said obstructing member having a solid body and a base, a pin-shaped extension projecting from said base, and said pin-shaped extension being adapted to be broken by a vehicle-sensitive actuating member to shatter the body of said obstructing member, said solid body is fitted in a receiving space adjacent said outlet opening of the container, said solid body having an end face opposite said base and directed towards an inner space of said container, a sealing film separating said receiving space from said inner space and having an outer edge sealingly connected to an inner wall surface of said container, said sealing film being supported by said solid body and having a radial shoulder between said receiving space and said outlet opening, and said base being seated on said radial shoulder, and said extension projecting through said outlet opening.

11. A device for inflating a gas bag of a vehicle occupant restraining system, said device comprising:
   a container of pressurized gas having at least one outlet opening;
   an obstructing member blocking said at least one outlet opening made of tempered glass arranged upstream of said at least one outlet opening, said obstructing member having a base and an elongate cylindrically pin-shaped extension having a length greater than its width projecting from said base; and
   a vehicle-sensitive means for breaking said pin-shaped extension to shatter said base of said obstructing member.

12. The device of claim 11, wherein said vehicle-sensitive means comprises a mass and a pyrotechnic charge for firing said mass at said pin-shaped extension.

13. The device of claim 11, wherein said vehicle-sensitive means comprises a pyrotechnic charge and means for directing a shock wave produced by said pyrotechnic charge toward said pin-shaped extension.

14. The device of claim 11, wherein said vehicle-sensitive means comprises an inertial body engageable with said pin-shaped extension.

* * * * *